United States Patent [19]
Yamazaki et al.

[11] Patent Number: 5,587,813
[45] Date of Patent: Dec. 24, 1996

[54] DATA TRANSFER DEVICE FOR AN IMAGE FORMING APPARATUS

[75] Inventors: Shuichi Yamazaki, Fujimi; Takashi Mama; Nobuyuki Sato, both of Yokohama; Takeshi Yamakawa, Fujisawa; Shinji Kobayashi; Yoshio Kaneko, both of Tokyo; Koji Oshikiri, Natori, all of Japan

[73] Assignee: Ricoh Company, Ltd., Tokyo, Japan

[21] Appl. No.: 98,940

[22] Filed: Jul. 29, 1993

[30] Foreign Application Priority Data

Jul. 31, 1992 [JP] Japan ................. 4-205706

[51] Int. Cl.⁶ .................. H04N 1/00; H04N 1/46; H04N 7/12; G03F 3/08
[52] U.S. Cl. .................. 358/500; 358/501; 358/505; 358/515; 358/518; 358/529; 358/530; 358/540; 358/425; 348/385
[58] Field of Search .................. 358/400, 401, 358/500, 501, 505, 512, 515, 518, 520, 529, 530, 540, 450, 425; 348/385

[56] References Cited

U.S. PATENT DOCUMENTS

| | | | |
|---|---|---|---|
| 4,293,872 | 10/1981 | Keller et al. | 358/540 |
| 4,591,903 | 5/1986 | Kawamura et al. | 358/540 |
| 4,891,691 | 1/1990 | Baba | 358/512 |
| 4,905,079 | 2/1990 | Hayashi | 358/515 |
| 5,028,993 | 7/1991 | Kobori et al. | 358/540 |
| 5,055,921 | 10/1991 | Usui | 358/512 |
| 5,057,914 | 10/1991 | Tsuji et al. | 358/530 |
| 5,105,267 | 4/1992 | Hayashi | 358/515 |
| 5,187,521 | 2/1993 | Shimizu et al. | 355/202 |
| 5,194,945 | 3/1993 | Kadowaki et al. | 358/520 |
| 5,239,383 | 8/1993 | Ikeda et al. | 358/448 |
| 5,289,270 | 2/1994 | Hayashi | 358/512 |

*Primary Examiner*—Edward L. Coles, Sr.
*Assistant Examiner*—Kimberly A. Williams
*Attorney, Agent, or Firm*—Oblon, Spivak, McClelland, Maier & Neustadt, P.C.

[57] ABSTRACT

A data transfer device for transferring data in a color digital copier, color printer or similar image forming apparatus of the type using a plurality of different kinds of data. A sending unit assigns other data to a predetermined number of bits of multilevel data to thereby send a plurality of kinds of data over common data lines. A receiving unit receives and separates the plurality of kinds of data. The device reduces the number of signal lines required for data transfer when a plurality of different kinds of data are not transferred at the same time.

16 Claims, 8 Drawing Sheets

DATA TRANSFER DEVICE FOR AN IMAGE FORMING APPARATUS

BACKGROUND OF THE INVENTION

The present invention relates to an image forming apparatus of the type transferring a plurality of different kinds of data, e.g., a color digital copier or a color printer and, more particularly, to a data transfer device for such an image forming apparatus.

In a conventional data transfer device for. e.g., a bicolor digital copier, black data having tonality represented by eight bits (256 levels) are transferred from a black processing unit of a sending station to a black processing unit of a receiving station. Red data having tonality represented by one bit (two levels) is transferred from a red processing unit of the receiving sending station to a red processing unit of the station. Specifically, the black processing unit of the sending station separates 8-bit black data, i.e., "0" to "255" from RGB data representative of a document read. The red processing unit of the sending station separates 1-bit red data, i.e., "0" or "1" from the RGB data. The black data are sent to the black processing unit of the receiving station over eight parallel signal lines. The red data is sent to the red processing unit over a single signal line. On receiving the black data, the black processing unit at the receiving station modulates a laser diode. The red processing unit of the receiving station modulates an light emitting diode (LED) array on the basis of the 1-bit red data.

Another conventional data transfer device for the above application uses red data having two bits. In this kind of device, two signal lines are assigned to red data. The red processing unit of the receiving station modulates the LED array on the basis of the 2-bit red data.

As stated above, the conventional data transfer devices transfer color data of each color over an exclusive line. Hence, even when black data have, e.g., only 255 levels ranging from "0" to "254", nine lines are needed since the number of bits is eight. It follows that the number of lines cannot be reduced even when the width of data to be sent is small. Moreover, in the case of a color digital copier and a color printer, red data and black data are not transferred at the same time due to the mechanism particular to an electrophotographic process. As a result, either of the two lines is simply wasted.

SUMMARY OF THE INVENTION

It is therefore an object of the present invention to provide a data transfer device for an image forming apparatus which reduces the number of signal lines required for data transfer when a plurality of different kinds of data are not transferred at the same time.

In accordance with the present invention, in a data transfer device applicable to an image forming apparatus and wherein a sending unit transfers a plurality of kinds of data, which are not effectively transferred at the same time, to a receiving unit as multilevel data, the sending unit assigns other data to a predetermined number of bits of multilevel data to thereby send a plurality of kinds of data over common data lines. The receiving unit receives and separates the plurality of kinds of data.

BRIEF DESCRIPTION OF THE DRAWINGS

The above and other objects, features and advantages of the present invention will become more apparent from the accompanying following detailed description taken with the drawings in which.

DESCRIPTION OF THE PREFERRED EMBODIMENTS

Figure 1:
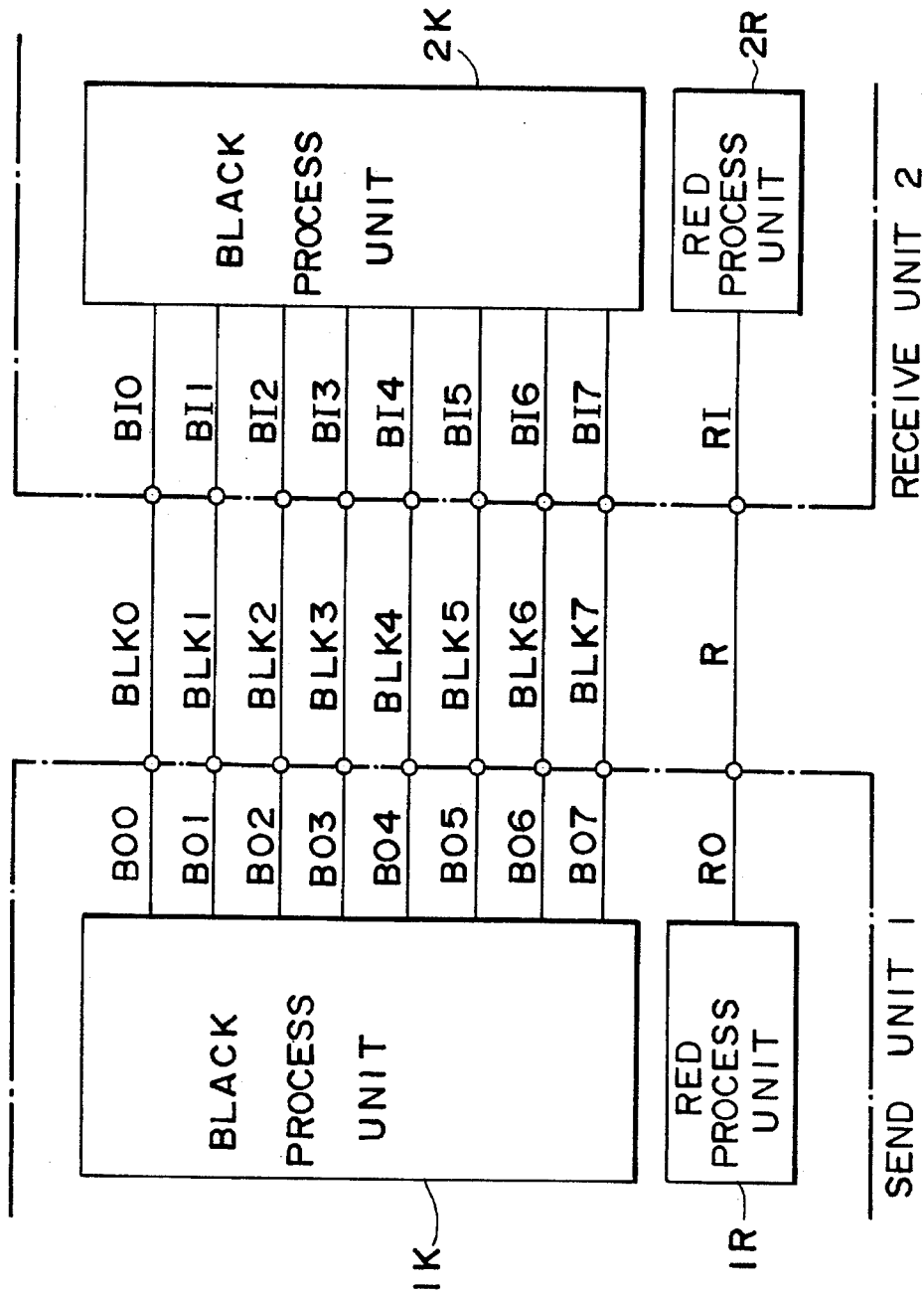
FIGS. 1 and 2 are block diagrams each schematically showing a specific conventional data transfer device.

To better understand the present invention, a brief reference will be made to conventional data transfer devices. FIG. 1 shows a prior art data transfer device applicable to a bicolor digital copier of the type forming a black image with a laser diode and a red image with an LED array. As shown, black data BO0–BO7 having tonality represented by eight bits (256 levels) are transferred from a black processing unit 1K to a black processing unit 2K. Red data R0 having tonality represented by one bit (two levels) is transferred from a red processing unit 1R to a red processing unit 2R. The processing units 1K and 1R constitute a sending unit 1 while the processing units 2K and 2R constitute a receiving unit 2.

Specifically, the black processing unit 1K separates 8-bit black data BO0–BO7. i.e., "0" to "255" from RGB data representative of a document read by a scanner, not shown. The red processing unit 1R separates 1-bit red data R0, i.e., "0" or "1" from the RGB dam. The black data BO0–BO7 are sent to the black processing unit 2K over parallel signal lines BLK0–BLK7, respectively. The red data is sent to the red processing unit 2R over a single signal line R. On receiving the black data BI0–BI7, the black processing unit 2K modulates a laser diode. The red processing unit 2R modulates an LED array on the basis of the 1-bit red data RI.

Figure 2:
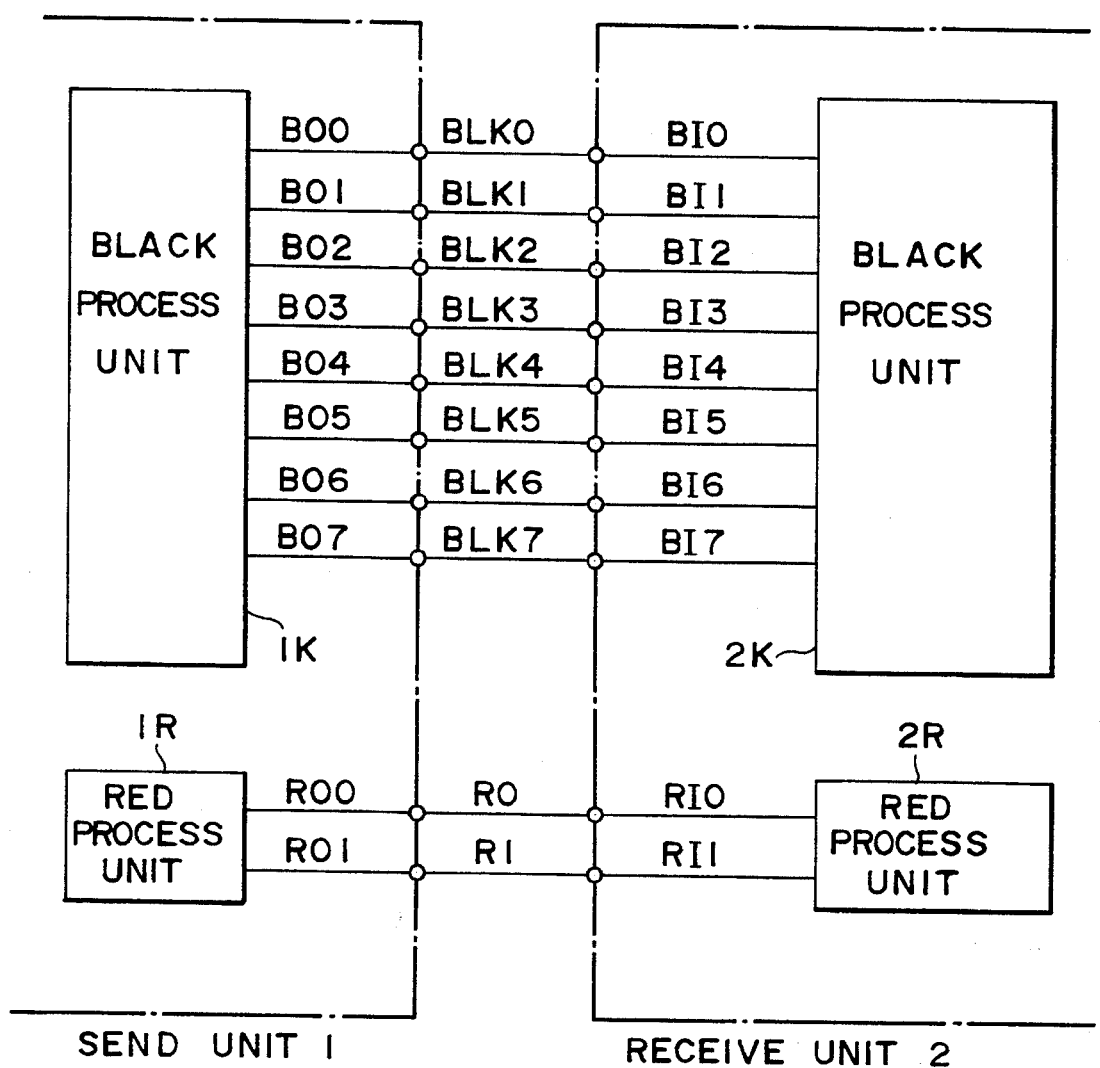

FIG. 2 shows another conventional data transfer device similar to the device of FIG. 1 except that red data has two bits, i.e., RO0 and RO1. The red processing unit 1R sends the 2-bit red data RO0 and RO1 to the red processing unit 2R over two signal lines R0 and R1, respectively. The red processing unit 2R modulates the LED array on the basis of the red data RI0 and RI1.

As stated above, the conventional data transfer devices transfer color data of each color over an exclusive line. This brings about the problems discussed earlier.

Preferred embodiments of the data transfer device in accordance with the present invention will be described hereinafter.

1st Embodiment

Figure 3:
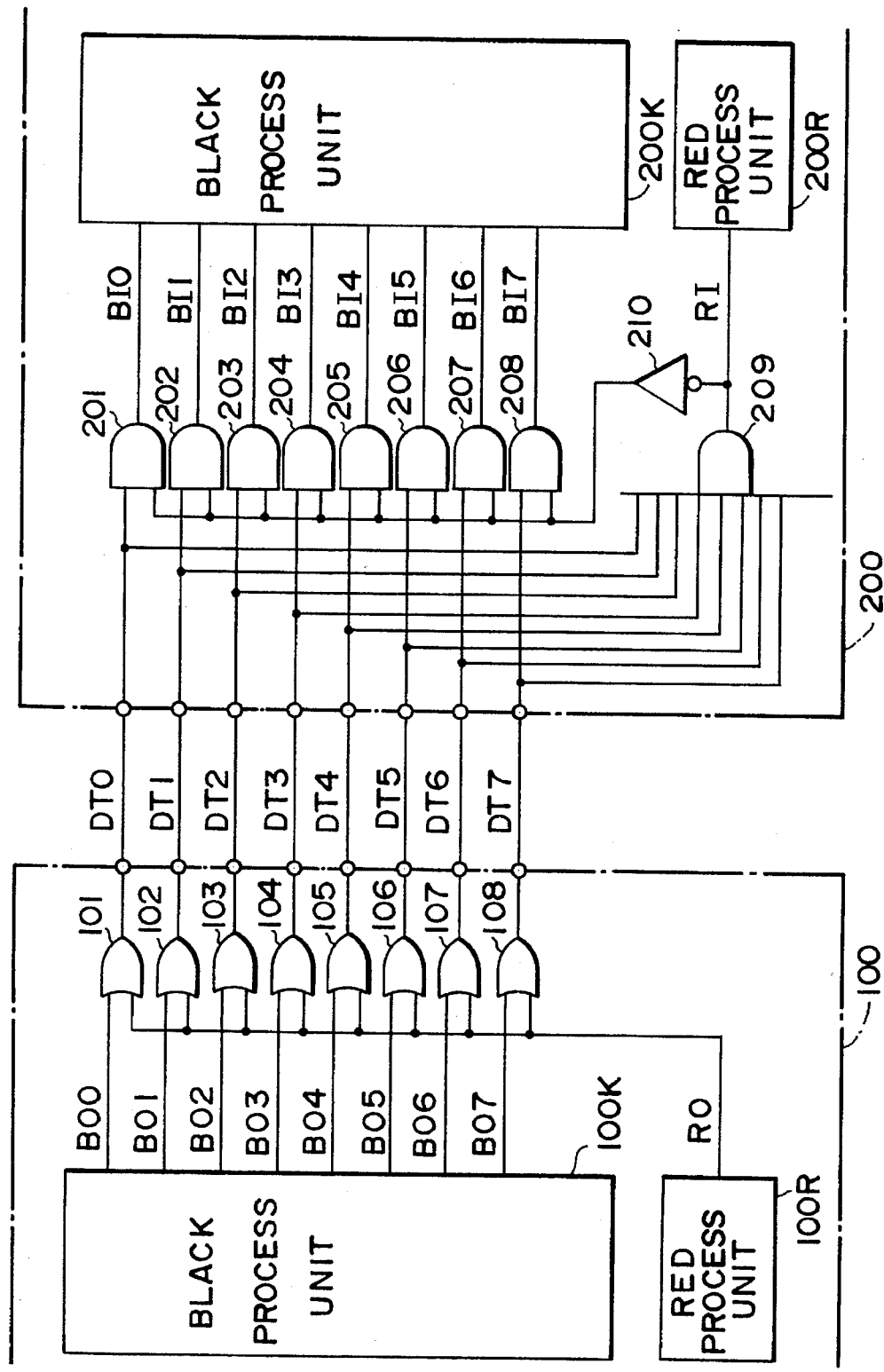
FIG. 3 is a block diagram schematically showing a first embodiment of the data transfer device in accordance with the present invention.
Figure 4:
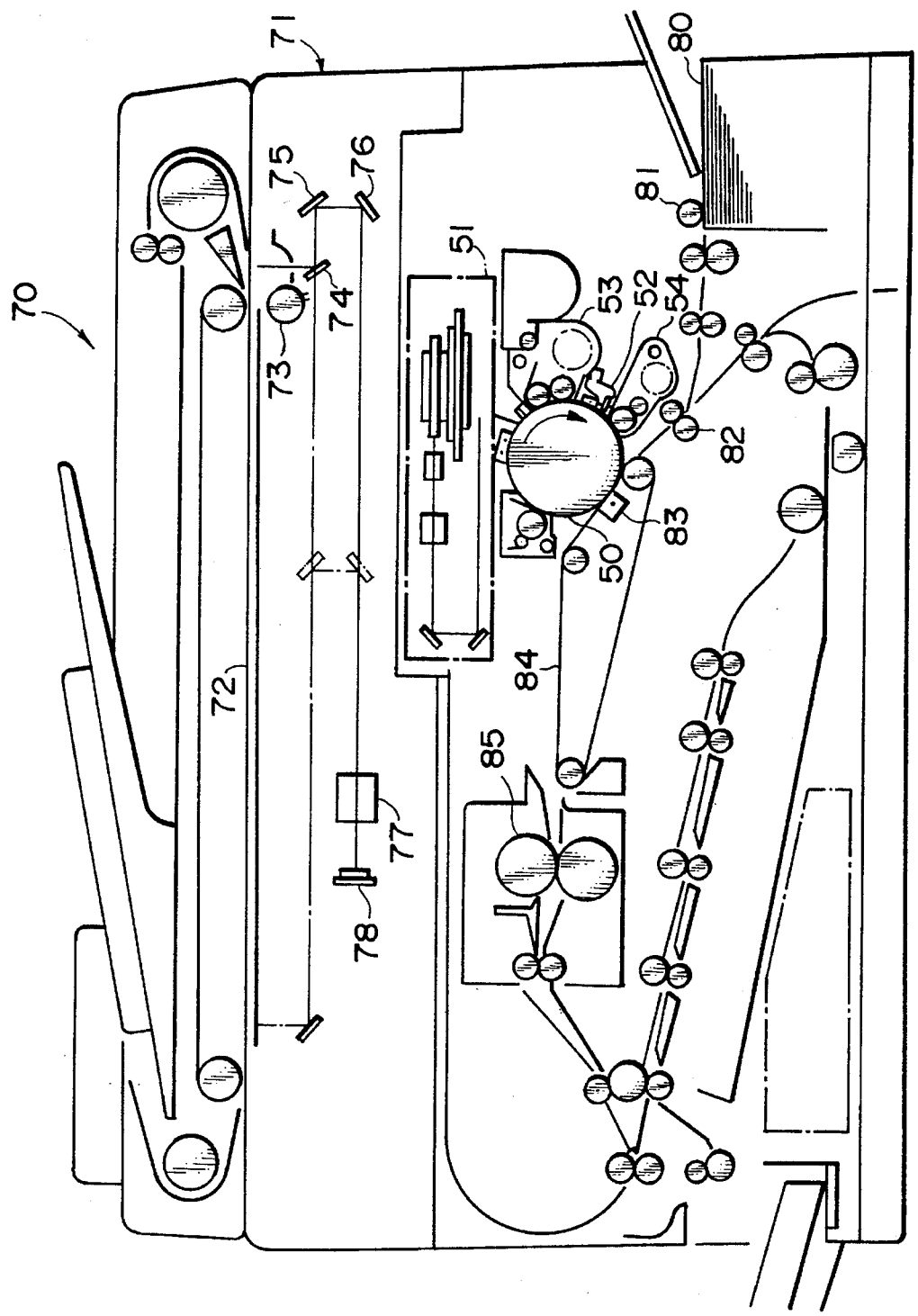
FIG. 4 is a section of a digital bicolor copier to which the first embodiment is applied.

Referring to FIGS. 3–7, a first embodiment of the present invention and a digital bicolor copier implemented therewith will be described. As shown in FIG. 4, an automatic document feeder (ADF) 70 feeds documents one by one to a glass platen 72 provided on the top of a scanner 71. As a lamp 73 illuminates the document laid on the glass platen 72, the resulting imagewise reflection is sequentially reflected by mirrors 74–76. A lens 77 focuses the reflection or imagewise light onto the surface of a solid state imaging device 78. The imaging device 78 separates the incident document image into color components and converts the color components to corresponding electric signals. As shown in FIG. 3, a sending unit 100 transforms the image data of separated colors to 8-bit black data and 1-bit red data. The black data and red data are respectively fed to a black processing unit 200K and a red processing unit 200R included in a first and a second exposing device 51 and 52, respectively. The exposing devices 51 and 52 are assigned to black and red, respectively.

As shown in FIG. 4, a photoconductive element in the form of a drum 50 is rotatable clockwise. The black exposing device 51, a black developing unit 53, the red exposing device 52, a red developing unit 54, and a transfer charger 83 are sequentially arranged around and in the direction of rotation of the drum 50. In this configuration, to superpose a red image and a black image, the black data and red data are not simultaneously applied to the exposing devices 51 and 52; that is, the red data is once stored in a memory, not shown, included in the sending unit 100 and a then fed to the exposing device 52 later than the black data. A recording medium, e.g., a paper sheet is fed from a tray 80 by a pick-up roller 81. A registration roller 82 drives the paper sheet such that the leading edge of the sheet meets that of an image formed on the drum 50. Then, the transfer charger 83 transfers the image from the drum 50 to the paper sheet. The paper sheet with the image is transported by a belt 84 roller to a fixing pair 85 to have the image fixed thereon. Finally, the paper sheet or copy is driven out of the copier.

Figure 5:
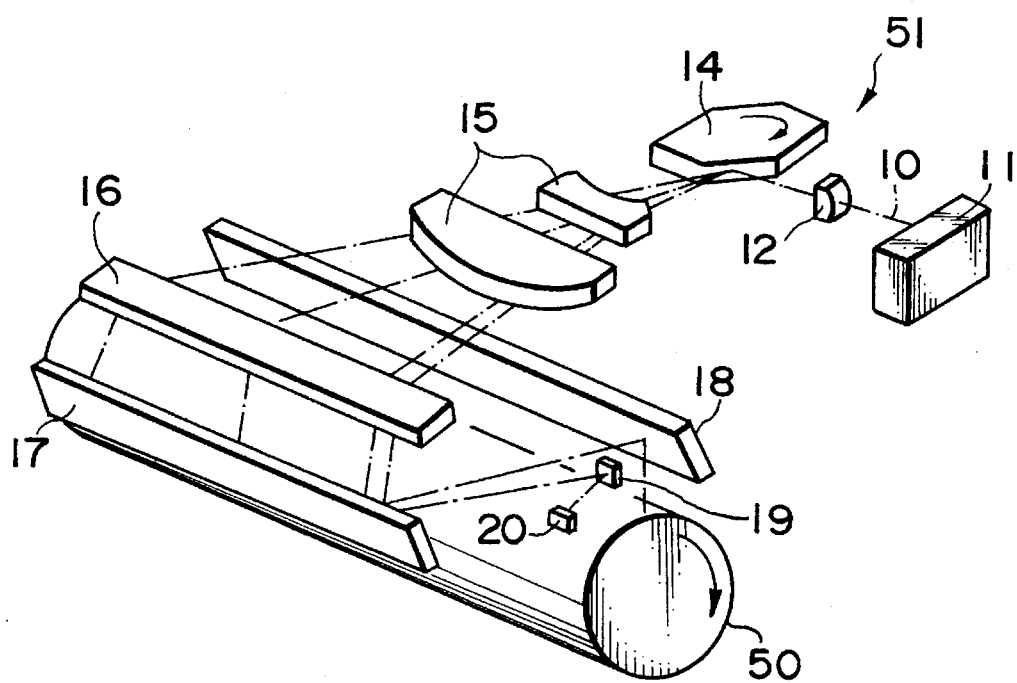
FIG. 5 is a view of a first exposing device included in the copier of FIG. 4.

Referring to FIG. 5, the first exposing device 51 has a laser unit 11 accommodating a laser diode (LD) and a condensing lens therein. The exposing device 51 emits a laser beam 10 modulated by the black processing unit 200K, FIG. 3, on the basis of the black data. The laser beam 10 is condensed by a cylindrical lens 12 onto the reflecting surfaces of a polygon mirror 14 only in the subscanning direction. The polygon mirror 14 is rotated by a polygon motor, not shown, to steer the laser beam 10 in the axial direction of the drum 50, i.e., the main scanning direction. As a result, the laser beam 10 scans the surface of the drum 50 to form a black latent image thereon. The latent image is developed by the black developing unit 53. The laser beam 10 steered by the polygon mirror 14 has been deflected at equal angular velocity. Hence, the laser beam 10 is deflected at equal velocity by an f-theta lens 15. Subsequently, the laser beam 10 is sequentially reflected by mirrors 16–18 to reach the drum 50. Further, the laser beam 10 is reflected by a mirror 19 to beam position sensing means 20. The output of the beam position sensing means 20 is used to maintain the record start position in the main scanning direction constant.

Figure 6:
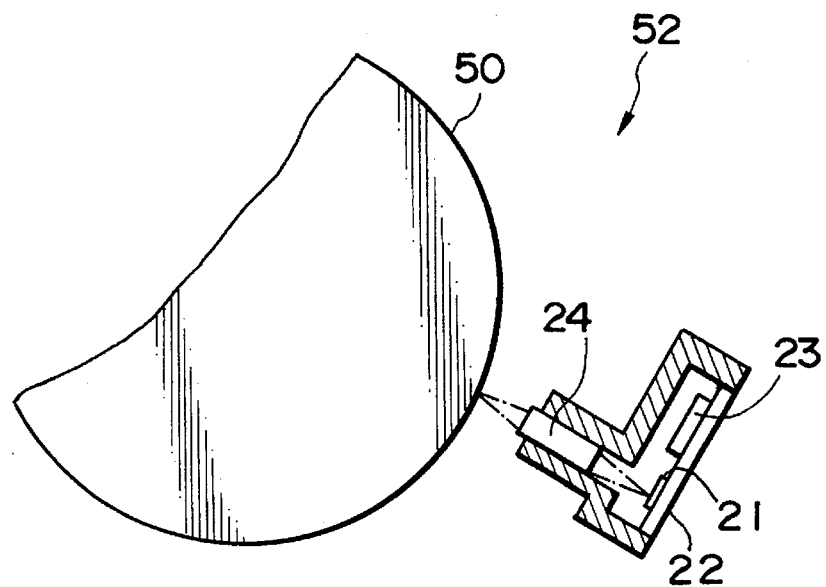
FIG. 6 is a section showing a second exposing device.

As shown in FIG. 6, the second exposing device 52 has an LED array chip 21. It is to be noted that the LED array chip 21 is a specific form of a self-emitting array type data writing device and may be replaced with a fluorescent lamp and a liquid crystal array or a PLZT shutter array belonging to the family of optical shutters. The LED array chip 21 is arranged on a ceramic substrate 22 to extend in a direction perpendicular to the sheet surface of FIG. 6. An IC 23 (red processing unit 200R) is also mounted on the substrate 22 for driving the LED array chip 21. The LED array chip 21 and IC 23 are connected together by wire bonding. Light issuing from the LED array chip 21 is condensed by a lens array 24 to form a red latent image on the drum 50. This latent image is developed by the red developing unit 54.

Figure 7:
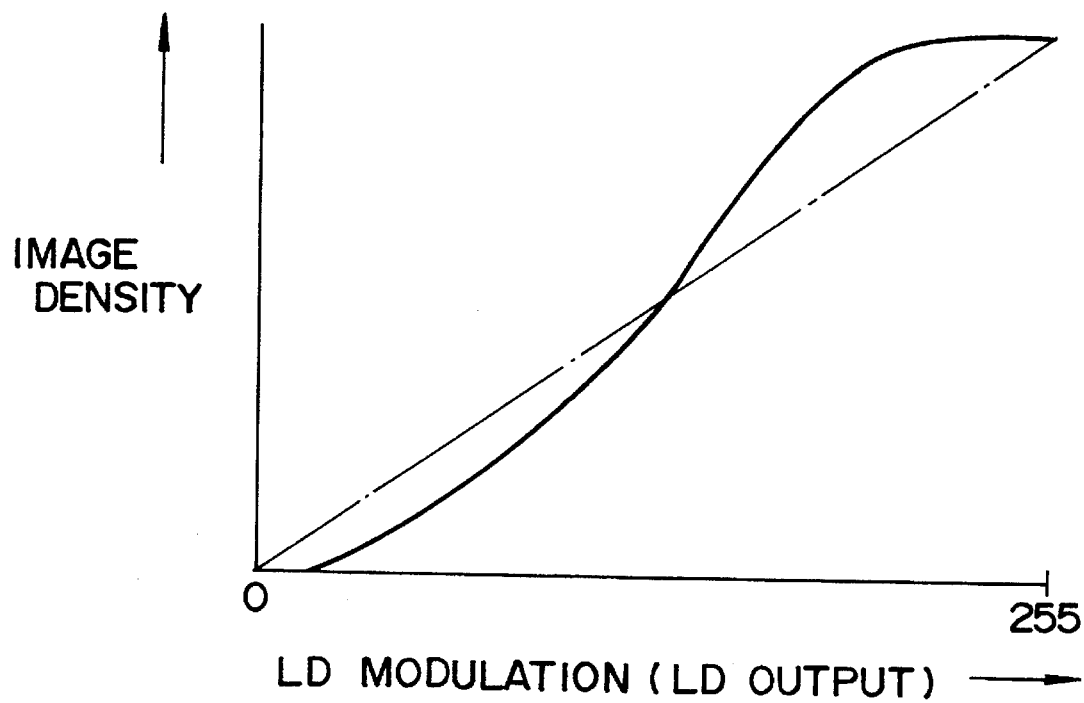
FIG. 7 is a graph representative of a relation between the laser output of the first exposing device and the image density.

FIG. 7 shows a relation between the output of the laser unit 11 and the image density. As shown, when the output of the laser unit 11 is intensified, the image density increases monotonously. However, in the range where the output of the laser unit 11 is great, the image density saturates. This means that medium outputs of the laser unit 11 suffice the representation of tonality, i.e., high and low outputs may safely be omitted. In light of this, the illustrative embodiment uses 8-bit black data having 255 levels, i.e., "0" to "254". Further, since the device of FIG. 4 does not output black data and red data at the same time, only black data, only red data or no data is transferred at a time.

Referring again to FIG. 3, the operation of the embodiment will be described. The black processing unit 100K at the sending station separates 8-bit black data of levels "0" to "254" from RGB data representative of a document and read by the scanner 71, FIG. 4. The resulting bit data BO0–BO7 are transferred to the receiving unit 200 via OR gates 101–108 and signal lines DT0–DT7, respectively. The red processing unit 100R separates 1-bit red data RO, i.e., "0" or "1" from the RGB data and transfers it to the unit 200 via the OR gates 101–108 and signal lines DT0–DT7.

In the receiving unit 200, AND gates 201–208 respectively gate the data on the signal lines DT0–DT7 in response to an output of an inverter 210, thereby producing black data BI0–BI7. The black data BI0–BI7 are fed to the black processing unit 200K. On the other hand, an AND gate 209 separates 1-bit red data RI from the data on the signal lines DT0–DT7 and feeds it to the red processing unit 200R. Also, the red data RI is inverted by the inverter 210 and is then applied to the AND gates 201–208.

The black processing unit 200K at the receiving station modulates the LD of the laser unit 11, FIG. 5, in response to the 8-bit black data BI0–BI7. Likewise, the red processing unit 200R modulates the LED array 21, FIG. 6, in response to the 1-bit red data RI.

The operation to be performed in each of the three different states, i.e., a no image state, a black image state, and a red image state is as follows. To begin with, in the no image state, i.e., when both the black data and the red data are "0", all the outputs of the OR gates 101–108 of the sending unit 100 are "0". Therefore, all the outputs BIO–BI7 of the AND gates 201–208 and the output RI of the AND gate 209 of the receiving unit 200 are also "0". When black data BO0–BO7 of "0" to "254" are transferred, it does not occur that all the outputs of the OR gates 101–108 are "1". Hence, the output RI of the AND gate 209 of the receiving unit 200 is "0" with the result that "1" is applied from the inverter 210 to the AND gates 201–208. Consequently, black data BI0–BI7 having 254 levels are output from the AND gates 201–208. In the event of the transfer of red data RO, all the outputs of the OR gates 101–108 of the sending unit 100 are "1" when the dam RO is "1". In this condition, the output RI of the AND gate 209 is "1". Also, since "0" is applied from the inverter 210 to the AND gates 201–208, all the outputs of the AND gates 201–208 are "0". When the red data RO is "0", all the outputs of the OR gates 101–108 of the sending unit 100 and, therefore, all the outputs of the AND gates 201–209 are "0".

As stated above, the embodiment assigns 8-bit data of "0" to "254" to black data BO0–BO7 and assigns the 256th data of the 8-bit data to red data RO. This is successful in reducing the number of lines required for data transfer.

2nd Embodiment

Figure 8:
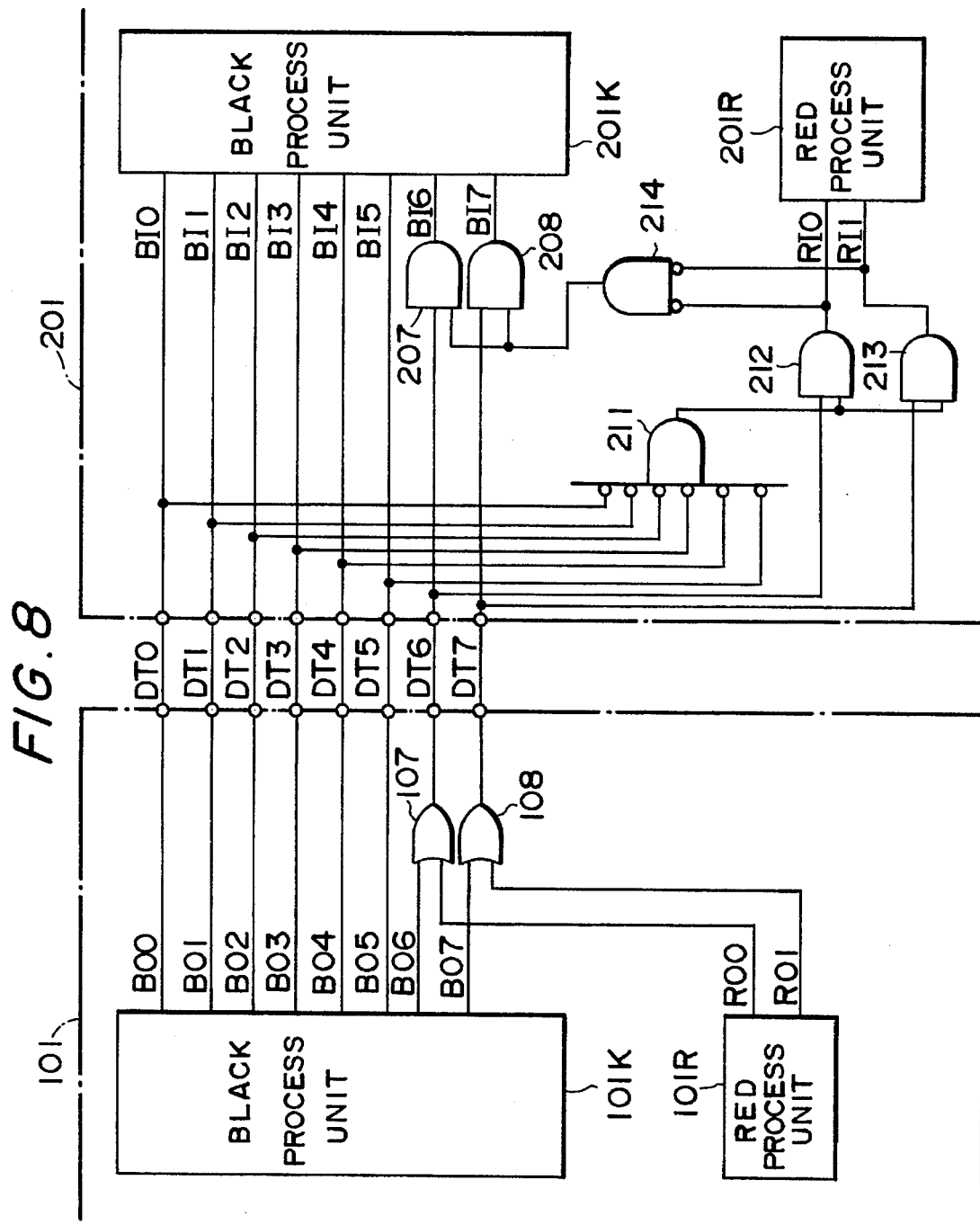
FIG. 8 is a block diagram schematically showing a second embodiment of the present invention.

A reference will be made to FIG. 8 for describing an alternative embodiment of the present invention. In this embodiment, 8-bit data of "0" to "252", i.e., 253 levels are assigned to black data BO0–BO7 while "253" to "255" of the 8-bit data are assigned to "0" to "3" of red data RO0 and RO1. Only black data are transferred over the lower 6-bit lines DT0–DT5. A sending unit 101 has only the OR gates 107 and 108 on the higher 2-bit lines DT6 and DT7, respectively. A receiving unit 201 includes the gates 207 and 208 and gates 211–214.

The conditions of the higher 2-bit lines DT6 and DT7 to occur in the no image state, black image state, and red image state will be described. In the no image state, i.e., when both the black data and the red data are "0", the outputs of the OR gates 107 and 108 of the sending unit 101 and, therefore, the outputs BI6 and BI7 of the AND gates 207 and 208 of the receiving unit 201 are "0". Also, all the black data BI0–BI7 are "0". Further, the outputs RI0 and RI1 of the AND gates 212 and 213 both are "0". When black data BO0–BO7 of "0" to "252" are sent, it does not occur that all the black data BO0–BO7 are "1". Hence, the output of the gate 211 of the receiving station is "0", and the outputs RI0 and RI1 of the AND gates 212 and 213 are "0". In this condition, the output of the GATE 214 is "1" with the result that the data on the lower 2-bit lines DT6 and DT7 are applied to a black processing unit 201K via the AND gates 207 and 208, respectively. On the other hand, when red data RO0 AND RO1 of "1" to "3" are transferred, the output of the gate 211 of the receiving station is "1" to cause the AND gates 212 and 213 to gate the 2-bit red data RO0 and RO1, respectively. At the same time, the red data RO0 and RO1 are gated by the AND gates 207 and 208 in response to the output of the gate 214. The condition wherein the red data RO0 and RO1 both are "0" is the same as the no image condition.

This embodiment assigns 8-bit data of 253 levels, i.e., "0" to "252" to black data and the 254th to 256th data of the 8-bit data to red data. Again, this is successful in reducing the number of signal lines required for data transfer.

3rd Embodiment

Figure 9:
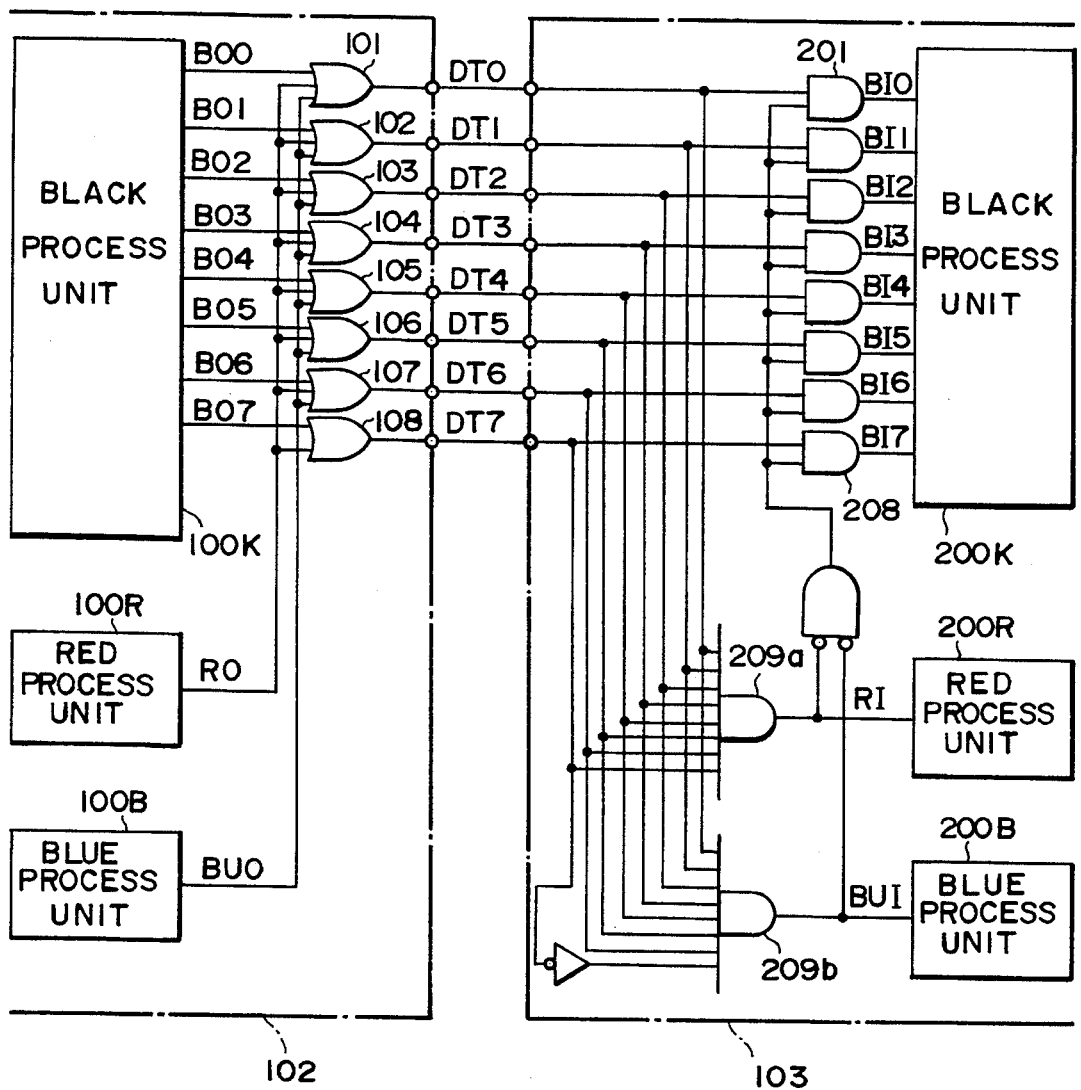
FIG. 9 is a block diagram schematically showing a third embodiment of the present invention.

Referring to FIG. 9, another alternative embodiment of the present invention is shown. The first and second embodiments each form a bicolor image, as described with reference to FIG. 4. In contrast, the third embodiment forms a tricolor image, i.e., in black, red and blue. For this purpose, blue processing units 100B and 200B are added, as shown in FIG. 9. In a digital bicolor copier, black, red and blue data are not sent at the same time, as in the bicolor copier. Hence, this embodiment assigns 8-bit data of 254 levels, i.e., "0" to "253" to black data, "254" to blue data, and "255" to red data.

In operation, in the no image state, all the outputs of the OR gates 101–108 and all the outputs BI0–BI7 of the AND gates 201–208 are "0". Also, the red output RI of an AND gate 209a and the blue output BUI of an AND gate 209a both are "0". When black data of "0" to "253" are transferred, both the red output RI of the AND gate 209a and the blue output BUI of the AND gate 209b are "0". Hence, the AND gates 201–208 gate the black data and feeds them to the black processing unit 200K. When blue data of "254" is transferred, the blue output BUI of the AND gate 209b is "1" while the red output RI of the AND gate 209a is "0". As a result, the blue data is applied to the blue processing unit 200B. Further, when red data of "255" is transferred, the red output RI of the AND gate 209a is "1" while the blue output BUI of the AND gate 209b is "0" Consequently, the red data is applied to the red processing unit 200R.

In summary, it will be seen that the present invention provides a data transfer device for an image forming apparatus which reduces the number of signal lines required for data transfer when a plurality of different kinds of data are not transferred at the same time. This is also true with a color digital copier, color printer or similar color image forming apparatus.

Various modifications will become possible for those skilled in the art after receiving the teachings of the present disclosure without departing from the scope thereof.

What is claimed is:

1. A data transfer device for an image forming apparatus, comprising:

a sending unit for outputting at different times at least first multilevel data of a first color and second multilevel data of a second color;

a plurality of data lines for communicating the first multilevel data and the second multilevel data output by the sending unit at different times;

a control unit for controlling whether the first multilevel data or whether the second multilevel data is communicated on the plurality of data lines; and a receiving unit for receiving and separating the first multilevel data and the second multilevel data communicated on the plurality of data lines, wherein the receiving unit records on an image receiving material an image of the first color and an image of the second color at different times, such that the image of the first color and the image of the second color are superposed on each other.

2. The data transfer device according to claim 1, wherein the control unit comprises:

a plurality of OR gates, each OR gate receiving as a first input one bit of the first multilevel data and as a second input a same bit of the second multilevel data.

3. The data transfer device according to claim 2, wherein the receiving unit comprises:

a plurality of first AND gates, each first AND gate receiving at one input one of the plurality of data lines;

at least one second AND gate having its inputs connected to each of the data lines; and an inverter having an input connected to an output of the at least one second AND gate and having an output connected to a second input of each of the first AND gates.

4. The data transfer device according to claim 2, wherein the sending unit further outputs third multilevel data of a third color.

5. A data transfer device for an image forming apparatus, comprising:

a sending means for outputting at different times at least first multilevel data of a first color and second multilevel data of a second color;

a plurality of data lines for communicating the first multilevel data and the second multilevel data output by the sending means at different times;

a control means for controlling whether the first multilevel data or whether the second multilevel data is communicated on the plurality of data lines; and a receiving means for receiving and separating the first multilevel data and the second multilevel data communicated on the plurality of data lines.

6. The data transfer device according to claim 5, wherein the control means comprises:

a plurality of OR gates, each OR gate receiving as a first input one bit of the first multilevel data and as a second input one bit of the second multilevel data.

7. The data transfer device according to claim 2, wherein the receiving unit comprises:

a plurality of first AND gates, each first AND gate receiving at one input one of the plurality of data lines;

at least one second AND gate having its inputs connected to each of the data lines; and an inverter means having an input connected to an output of the at least one second AND gate and having an output connected to a second input of each of the first AND gates.

8. The data transfer device according to claim 6, wherein the sending means further outputs third multilevel data of a third color.

9. A data transfer device for an image forming apparatus, comprising:

a sending unit including a first color process unit and a second color process unit for respectively outputting at different times at least first multilevel data of the first color and second multilevel data of the second color;

a plurality of data lines for communicating the first multilevel data and the second multilevel data output by the sending unit at different times;

a control unit for controlling whether the first multilevel data or whether the second multilevel data is communicated on the plurality of data lines; and a receiving unit for receiving and separating the first multilevel data and the second multilevel data communicated on the plurality of data lines, wherein the receiving unit records on an image receiving material an image of the first color and an image of the second color at different times, such that the image of the first color and the image of the second color are superposed on each other.

10. The data transfer device according to claim 9, wherein the control unit comprises:

a plurality of OR gates, each OR gate receiving as a first input one bit of the first multilevel data and as a second input one bit of the second multilevel data.

11. The data transfer device according to claim 10, wherein the receiving unit comprises:

a plurality of first AND gates, each first AND gate receiving at one input one of the plurality of data lines;

at least one second AND gate having its inputs connected to each of the data lines; and an inverter having an input connected to an output of the at least one second AND gate and having an output connected to a second input of each of the first AND gates.

12. The data transfer device according to claim 10, wherein the sending unit further comprises a third color process unit which outputs third multilevel data of the third color.

13. A data transfer device for an image forming apparatus, comprising:

a sending means including a first color process unit and a second color process unit for respectively outputting at different times at least first multilevel data of the first color and second multilevel data of the second color;

a plurality of data lines for communicating the first multilevel data and the second multilevel data output by the sending means at different times;

a control means for controlling whether the first multilevel data or whether the second multilevel data is communicated on the plurality of data lines; and a receiving means for receiving and separating the first multilevel data and the second multilevel data communicated on the plurality of data lines.

14. The data transfer device according to claim 13, wherein the control means comprises:

a plurality of OR gates, each OR gate receiving as a first input one bit of the first multilevel data and as a second input one bit of the second multilevel data.

15. The data transfer device according to claim 14, wherein the receiving unit comprises:

a plurality of first AND gates, each first AND gate receiving at one input one of the plurality of data lines;

at least one second AND gate having its inputs connected to each of the data lines; and an inverter means having an input connected to an output of the at least one second AND gate and having an output connected to a second input of each of the first AND gates.

16. The data transfer device according to claim 14, wherein the sending means further comprises a third color output unit which outputs third multilevel data of the third color.

* * * * *